United States Patent
Wang et al.

(10) Patent No.: US 6,763,464 B2
(45) Date of Patent: *Jul. 13, 2004

(54) SELF-PROTECTING DOCUMENTS

(75) Inventors: Xin Wang, Los Angeles, CA (US);
Thanh T. Ta, Huntington Beach, CA (US); Prasad Ram, Manhattan Beach, CA (US)

(73) Assignee: ContentGuard Holdings, Inc., Wilmington, DE (US)

( * ) Notice: Subject to any disclaimer, the term of this patent is extended or adjusted under 35 U.S.C. 154(b) by 102 days.

This patent is subject to a terminal disclaimer.

(21) Appl. No.: 10/196,953

(22) Filed: Jul. 18, 2002

(65) Prior Publication Data

US 2002/0194485 A1 Dec. 19, 2002

Related U.S. Application Data

(63) Continuation of application No. 09/178,529, filed on Oct. 23, 1998, now Pat. No. 6,519,700.

(51) Int. Cl.[7] .......................... G06F 12/16; H04N 7/167; H04L 9/14
(52) U.S. Cl. .......................... 713/193; 713/160; 380/45; 380/201; 705/51; 705/57
(58) Field of Search ................................. 713/160, 183; 380/28, 42, 44, 45, 47, 201; 705/51, 56, 57

(56) References Cited

U.S. PATENT DOCUMENTS

| | | |
|---|---|---|
| 4,712,238 A | 12/1987 | Gilhousen et al. ............ 380/20 |
| 5,742,677 A | 4/1998 | Pinder et al. .................. 380/4 |
| 5,796,829 A | 8/1998 | Newby et al. ................ 380/21 |
| 5,915,019 A | 6/1999 | Ginter et al. .................. 380/4 |
| 6,052,780 A | 4/2000 | Glover ....................... 713/193 |
| 6,519,700 B1 * | 2/2003 | Ta et al. ..................... 713/193 |

* cited by examiner

Primary Examiner—Justin T. Darrow
(74) Attorney, Agent, or Firm—Nixon Peabody, LLP; Marc S. Kaufman

(57) ABSTRACT

A system and method for the secure distribution of electronic documents reduces the likelihood of unauthorized reproduction and redistribution by either authorized or unauthorized recipients. A self-protecting document (SPD) contains an encrypted document as well as a secure set of permissions and the software necessary to process the document; full decryption of the document is performed as late as possible so as to minimize the possibility of intercepting the document before it has been fully rendered to screen or to paper.

11 Claims, 6 Drawing Sheets

SELF-PROTECTING DOCUMENTS

CROSS REFERENCES TO RELATED APPLICATIONS

This application is a continuation under 37 C.F.R. 1.53(b) of U.S. patent application Ser. No. 09/178,529 now U.S. Pat. No. 6,519,700 B1, filed Oct. 23, 1998.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office file or records, but otherwise reserves all copyright rights whatsoever.

FIELD OF THE INVENTION

The invention relates to document rights management, and more particularly, to a self-protecting document scheme that enables electronic document protection without the need for additional software or hardware support for protection.

BACKGROUND OF THE INVENTION

One of the most important issues impeding the widespread distribution of digital documents via electronic commerce is the current lack of protection of the intellectual property rights of content owners during the distribution and use of those digital documents. Efforts to resolve this problem have been termed "Intellectual Property Rights Management" ("IPRM"), "Digital Property Rights Management" ("DPRM"), "Intellectual Property Management" ("IPM"), "Rights Management" ("RM"), and "Electronic Copyright Management" ('ECM").

A document, as the term is used herein, is any unit of information subject to distribution or transfer, including but not limited to correspondence, books, magazines, journals, newspapers, other papers, software, photographs and other images, audio and video clips, and other multimedia presentations. A document may be embodied in printed form on paper, as digital data on a storage medium, or in any other known manner on, a variety of media.

In the world of printed documents, a work created by an author is usually provided to a publisher, which formats and prints numerous copies of the work. The copies are then sent by a distributor to bookstores or other retail outlets, from which the copies are purchased by end users.

While the low quality of copying and the high cost of distributing printed material have served as deterrents to the illegally copying of most printed documents, it is far too easy to copy, modify, and redistribute unprotected electronic documents. Accordingly, some method of protecting electronic documents is necessary to make it harder to illegally copy them. This will serve as a deterrent to copying, even if it is still possible, for example, to make hardcopies of printed documents and duplicate them the old-fashioned way.

With printed documents, there is an additional step of digitizing the document before it can be redistributed electronically; this serves as a deterrent. Unfortunately, it has been widely recognized, that there is no viable way to prevent people from making unauthorized distributions of electronic documents within current general-purpose computing and communications systems such as personal computers, workstations, and other devices connected over local area networks (LANs), intranets, and the Internet. Many attempts to provide hardware-based solutions to prevent unauthorized copying have proven to be unsuccessful.

Two basic schemes have been employed to attempt to solve the document protection problem: secure containers and trusted systems.

A "secure container" (or simply an encrypted document) offers a way to keep document contents encrypted until a set of authorization conditions are met and some copyright terms are honored (e.g. payment for use). After the various conditions and terms are verified with the document provider, the document is released to the user in clear form. Commercial products such as IBM's Cryptolopes and InterTrust's Digiboxes fall into this category. Clearly, the secure container approach provides a solution to protecting the document during delivery over insecure channels, but does not provide any mechanism to prevent legitimate users from obtaining the clear document and then using and redistributing it in violation of content owners' intellectual property.

Cryptographic mechanisms are typically used to encrypt (or "encipher") documents that are then distributed and stored publicly, and ultimately privately deciphered by authorized users. This provides a basic form of protection during document delivery from a document distributor to an intended user over a public network, as well as during document storage on an insecure medium.

In the "trusted system" approach, the entire system is responsible for preventing unauthorized use and distribution of the document. Building a trusted system usually entails introducing new hardware, such as a secure processor, secure storage and secure rendering devices. This also requires that all software applications that run on trusted systems be certified to be trusted. While building tamperproof trusted systems is still a real challenge to existing technologies, current market trends suggest, that open and untrusted systems such as PC's and workstations will be the dominant systems used to access copyrighted documents. In this sense, existing computing environments such as PC's and workstations equipped with popular operating systems (e.g., Windows and UNIX) and render applications (e.g., Microsoft Word) are not trusted systems and cannot be made trusted without significantly altering their architectures.

Accordingly, although certain trusted components can be deployed, one must continue to rely upon various unknown untrusted elements and systems. On such systems, even if they are expected to be secure, unanticipated bugs and weaknesses are frequently found and exploited.

There are a number of issues in rights management; authentication, authorization, accounting, payment and financial clearing, rights specification, rights verification, rights enforcement, and document protection. Document protection is a particularly important issue. After a user has honored the rights of the content owner and has been permitted to perform a particular operation with a document (e.g., print it, view it on-screen, play the music, or execute the software), the document is presumably in-the-clear, or unencrypted. Simply stated, the document protection problem is to prevent the content owner's rights from being compromised when the document is in its most vulnerable state, stored, in the clear, on a machine within the user's control. Even when documents are securely delivered (typically in encrypted form) from a distributor to the user, it must be rendered to a presentation data form before the user can view or otherwise manipulate the document. Accordingly, to achieve the highest level of protection, it is important to protect the document contents as much as possible, while revealing them to the user at a late stage and in a form that is difficult to recover into a useful form.

In the known approaches to electronic document distribution that employ encryption, an encrypted document is rendered in several separate steps. First, the encrypted document is received by the user. Second, the user employs his private key (in a public key cryptosystem) to decrypt the data and derive the document's clear content. Finally, the clear content is then passed on to a rendering application, which translates the computer-readable document into the finished document, either for viewing on the user's computer screen or for printing a hardcopy. The clear content is required for rendering because, in most cases, the rendering application is a third-party product (such as Microsoft Word or Adobe Acrobat Reader) that requires the input document to be in a specific format. It should be appreciated, then, that between the second and third steps, the previously protected document is vulnerable. It has been decrypted, but is still stored in clear electron form on the user's computer. If the user is careless or is otherwise motivated to minimize fees, the document may be easily redistributed without acquiring the necessary permissions from the content owner.

Accordingly, it would be beneficial to provide an electronic document distribution scheme that minimizes the disadvantages of known systems. Such a scheme would prevent users from obtaining a useful form of an electronically-distributed document during the decryption and rendering processes.

SUMMARY OF THE INVENTION

The present self-protecting document ("SPD") is not subject to the above-stated disadvantages of the prior art. By combining an encrypted document with a set of permissions and an executable code segment that includes most of the software necessary to extract and use the encrypted document, the self-protecting document accomplishes protection of document contents without the need for additional hardware and software.

The SPD system is broken down between a content creator (analogous to the author and the publisher of the traditional model) and a content distributor. The author/publisher creates the original document, and decides what rights are to be permitted. The distributor then customizes the document for use by various users, ensuring via the customization that the users do not exceed the permissions they purchased.

At the user's system, the self-protecting document is decrypted at the last possible moment. In an embodiment of the invention, various rendering facilities are also provided within the SPD, so that the use of the SPD need not rely upon external application that might not be trustworthy (and that might invite unauthorized use). In an alternative embodiment interfaces and protocols are specified for a third-party rendering application to interact with the SPD to provide trusted rendering.

In one embodiment of the invention, the encrypted document is decrypted by the user's system while simultaneously "polarizing" it with a key that is dependent, at least in part, on the state of he user's system. The polarization may be cryptographically less secure than the encryption used for distribution, but serves to deter casual copying. In this embodiment, depolarization is performed during or after the rendering process, so as to cause any intermediate form of the document to be essentially unusable.

BRIEF DESCRIPTION OF THE DRAWINGS

The structure and function of the invention is best understood with reference to the included drawings, which may be described as follows.

DETAILED DESCRIPTION OF THE INVENTION

The invention is described below, wit reference to detailed illustrative embodiments. It will be apparent that the invention can be embodied in a wide variety of forms, some of which may be quite different from those of the disclosed embodiments, Consequently, the specific structural and functional details disclosed herein are merely representative and do not limit the scope of the invention.

Figure 1:
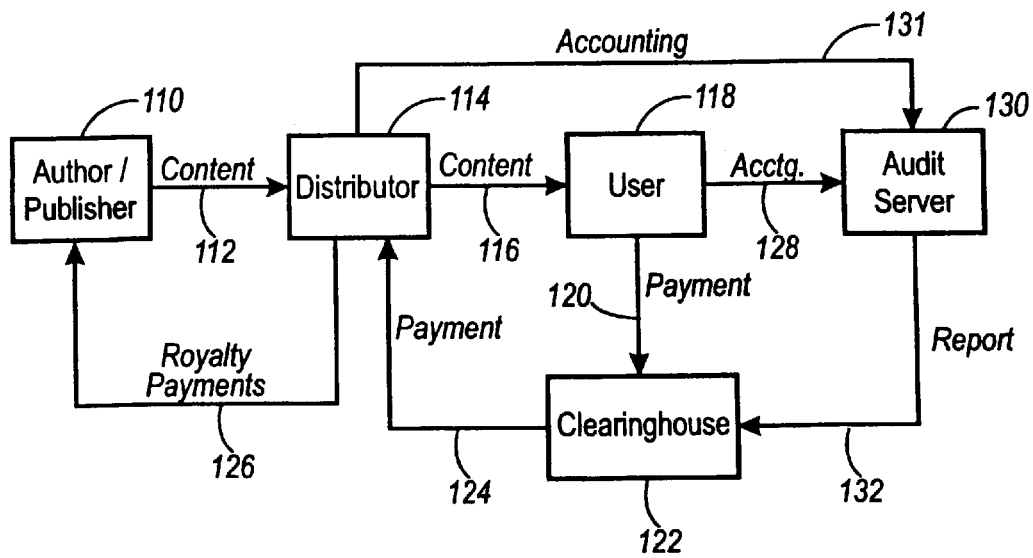
FIG. 1 is a top-level block diagram representing a model for the creation and commercial distribution of electronic documents in either secure or insecure environments.

FIG. 1 represents a top-level functional model for a system for the electronic distribution of documents, which as defined above, may include correspondence, books, magazines, journals, newspapers, other papers, software, audio and video clips, and other multimedia presentations.

An author (or publisher) 110 creates a document's original content 112 and passes it to a distributor 114 for distribution. Although it is contemplated that the author may also distribute documents directly, without involving another party as a distributor, the division of labor set forth in FIG. 1 is more efficient, as it allows the author/publisher 110 to concentrate on content creation, and not the mechanical and mundane functions taken over by the distributor 114. Moreover, such a breakdown would all allow the distributor 114 to realize economies of scale by associating with a number of authors and publishers (including the illustrated author/publisher 110).

The distributor 114 then passes modified content 116 to a user 118. In a typical electronic distribution model, the modified content 116 represents an encrypted version of the original content 112; the distributor 114 encrypts the original content 112 with the user 118's public key, and modified content 116 is customized solely for the single user 118. The user 118 is then able to use his private key to decrypt the modified content 116 land view the original content 112.

A payment 120 for the content 112 is passed from the user 118 to the distributor 114 by way of a clearinghouse 122. The clearinghouse 122 collects requests from the user 118 and from other users who wish to view a particular document. The clearinghouse 122 also collects payment information, such as debit transactions, credit card transactions, or other known electronic payment schemes, and forwards the collected users' payments as a payment batch 124 to the distributor 114. Of course, it is expected that the clearinghouse 122 will retain a share of the user's payment 120. In turn, the distributor 114 retains a portion of the payment batch 124 and forwards a payment 126 (including royalties) to the author and publisher 110. In one embodiment of this scheme, the distributor 114 awaits a bundle of user requests for a single document before sending anything out. When this is done, i a single document with modified content 116 can be generated for decryption by all of the requesting users. This technique is well-known in the art.

In the meantime, each time the user 118 requests (or uses) a document, an accounting message 128 is sent to an audit server 130. The audit server 130 ensures that each request by the user 118 matches with a document sent by the distributor 114; accounting information 131 is received by the audit server 130 directly from the distributor 114. Any inconsistencies are transmitted via a report 132 to the clearinghouse 122, which can then adjust the payment batches 124 made to the distributor 114, This accounting scheme is present to reduce the possibility of fraud in this electronic document distribution model, as well as to handle any time-dependent usage permissions that may result in charges that vary, depending on the duration or other extent of use.

The foregoing model for electronic commerce in documents, shown in FIG. 1, is in common use today. As will be shown in detail below, it is equally applicable to the system and method set forth herein for the distribution of self-protecting documents.

Figure 2:
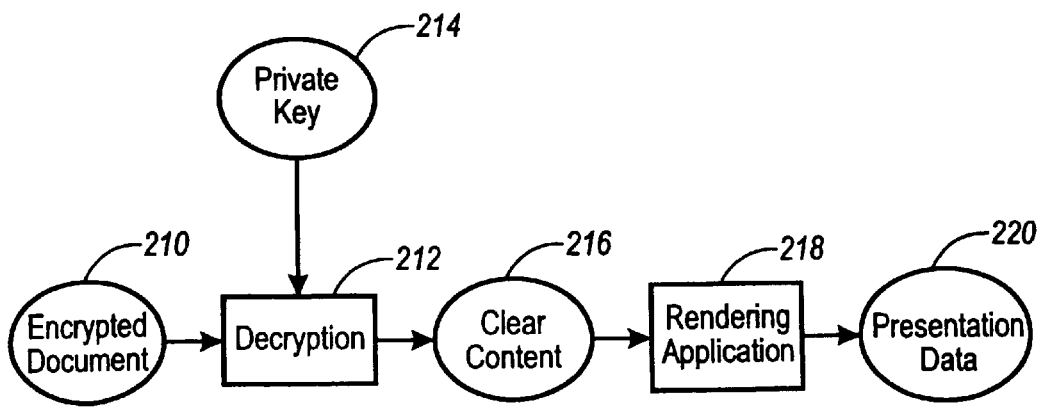
FIG. 2 is a flow diagram illustrating the decryption of protected electronic documents according to the art.

Turning now to FIG. 2, the steps performed by the user 118 (FIG. 1) in a prior art system for electronic document distribution are shown. As discussed above, cryptographic mechanisms are typically used to encipher documents. Those encrypted documents are then distributed and stored publicly and deciphered privately by authorized users. This provides a basic form of protection during document delivery from a document distributor to an intended user over a public network, as well during document storage on an insecure medium.

At the outset, an encrypted document 210 is received by the user 118 and passed to a decryption step 212. As is well known in the art, the decryption step 212 receives the user 118's private key, which is stored locally at the user's computer or entered by the user when needed. The document 210 is decrypted, resulting in clear content 216 similar or identical to the original content 112 (FIG. 1).

The clear content 216 is passed to rendering application 218, which constructs presentation data 220, or a usable vision of the document's original content 112. In typical systems of this kind, the presentation data 220 is data immediately suitable for display on a video screen, for printing as a hardcopy, or for other use depending on the document type.

As discussed above, the document is vulnerable in systems like this. The clear content 216 can be copied, stored, or passed along to other users without the knowledge or consent of the distributor 114 or the author/publisher 110. Even a legitimate user may be tempted to minimize the licensing fees by capturing the document in the clear in order to redistribute and use it at will, without honoring the intellectual property of the content owners. As discussed above, the present invention is directed to a scheme for preventing such a user from obtaining a useful form of the document during the rendering process on the user's system.

Accordingly, the system and method of the present invention sets forth an alternative scheme for handling encrypted documents at the user 118's system. A simple embodiment of this scheme is illustrated in FIG. 3.

Figure 3:
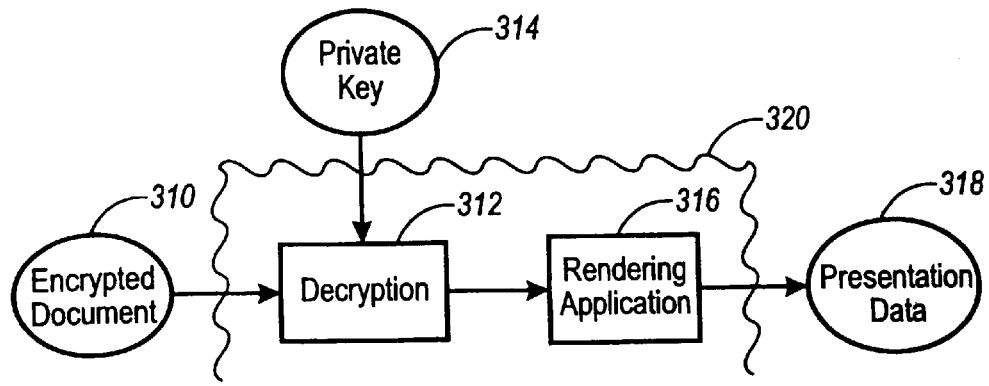
FIG. 3 is a flow diagram illustrating the decryption of protected electronic documents according to a simple embodiment of the invention.
Figure 4:
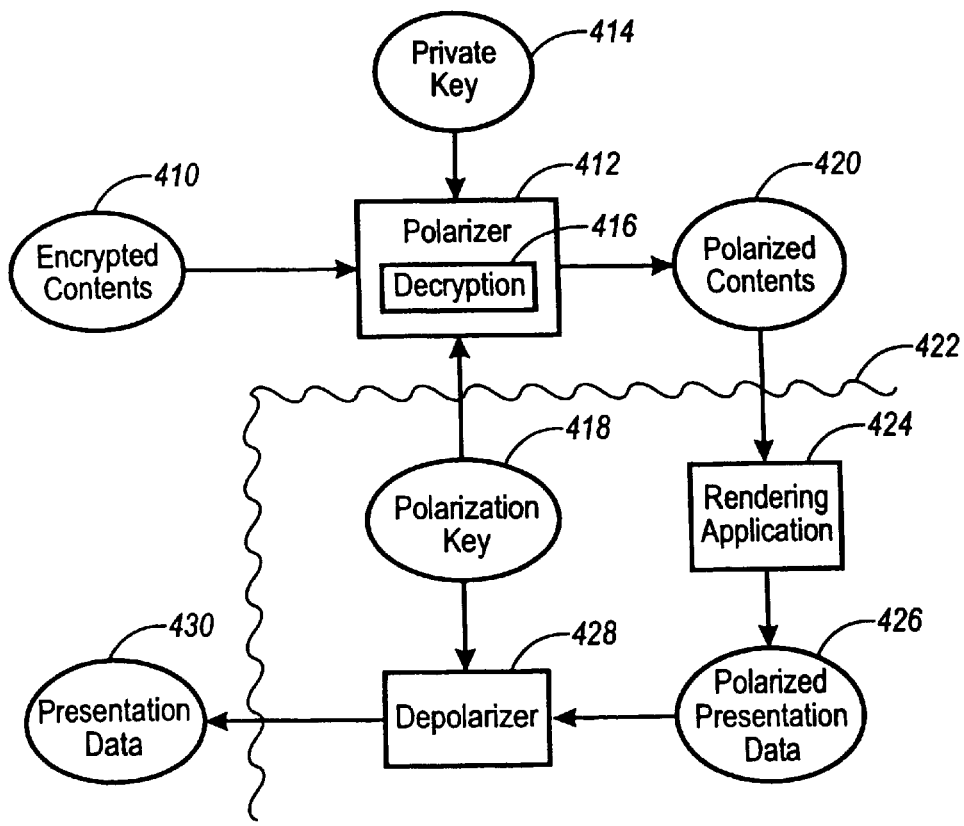
FIG. 4 is a flow diagram illustrating the decryption of protected electronic documents according to a preferred embodiment of the invention.

FIG. 3 looks similar to FIG. 2, in that an encrypted document 310 is passed to a decryption step 312 (which uses a private key 314) and a rendering application 316, resulting in presentation data 318. However, an additional layer of protection is provided by a protecting shell 320. The protecting shell 320 allows the document 310 to be decrypted and rendered without ever leaving clear content (as in the clear content 216 of FIG. 2) available to be intercepted. This is accomplished by including decryption and rendering elements within the document 310, as will be described below with reference to FIG. 5. The included decryption and rendering elements are adapted to limit the user's interaction with the SPD, prohibiting certain operations (such as saving the document or performing cut-and-paste operations) according to the user's permissions, FIG. 4 is a more sophisticated version. The scheme of FIG. 4 includes an intermediate "polarization" step adapted to secure the document after it has been decrypted but before it is rendered. First, the encrypted document contents 410 are passed to a polarizer 412. The polarizer 412 receives the user's private key 414 and, via a decryption step 416, decrypts the document contents 410. Concurrently, the polarizer 412 receives a polarization key 418 from the user's system.

This polarization key 418 is used by the polarizer 412 to transform the document to a version having polarized contents 420. All of these operations can take place in the open, without any kind of protective mechanism, provided the polarizer 412 does not store a clear version of the document between decrypting it and polarizing it.

In one embodiment of the invention, the polarization key 418 represents a combination of data elements taken from the user's system's internal state, such as the date and time of day, elapsed time since the last keystroke, the processor's speed and serial number, and any other information that can be repeatably derived from the user's system. It is useful to include some time-derived information in the polarization key 418 so that interception and seizure of polarized contents 420 would not be useful. Further rendering of the polarized document would not be possible, as the system time would have changed too much.

Then, once again within a protecting shell 422, the polarized contents 420 are passed to a rendering application 424. As discussed above, typical rendering applications are third-party applications such as Microsoft Word or Adobe Acrobat Reader. However, it is likely that such external rendering applications will not be able to process the polarized contents 420, as the contents, any formatting codes, and other cues used by the renderer will have been scrambled in the polarization process.

Hence, the rendering application 424 must be commutative (or at least fault-tolerant), or it must receive polarized contents 420 that are largely complete and processable by the application. The latter possibility will be discussed below, in connection with FIG. 9.

The output of the rendering application is polarized presentation data 426, which has been formatted by the rendering application 424 but is still polarized, and hence not readable by the user. The polarized presentation data 426 is passed to a depolarizer 428, which receives the polarization key 418 and restores the original form of the document as presentation data 430. In one embodiment of the invention, the depolarization function is combined with the rendering or display function. In this case, the polarized presentation data 426 is received directly by a display device, which can be separate from the user's system and receive data over a communications channel.

Creation of the polarization key 418, the rendering application 418, and the depolarization stop 428 are all elements of the protecting shell 422; these are tamper-resistant program elements. It is contemplated that all computational steps that occur within the protecting shell 422 will use local data only, and will not store temporary data to any globally accessible storage medium or memory area; only the explicit results will be exported from the protecting shell 422. This approach will prevent users from easily modifying operating system entry points or scavenging system resources so as to intercept and utilize intermediate data.

It should be noted that the presentation data 430 of FIG. 4, in alternative embodiments of the invention, can be either device independent or device dependent. In the device-independent case, additional processing by a device driver (such as a display driver or a printer driver) typically is necessary to complete the rendering process. In the presently preferred device-dependent case, the device-specific modifications to the presentation data have already been made (either in the rendering application 424 or the depolarizing step 428), and the presentation data 430 can be sent directly to the desired output device.

Figure 5:
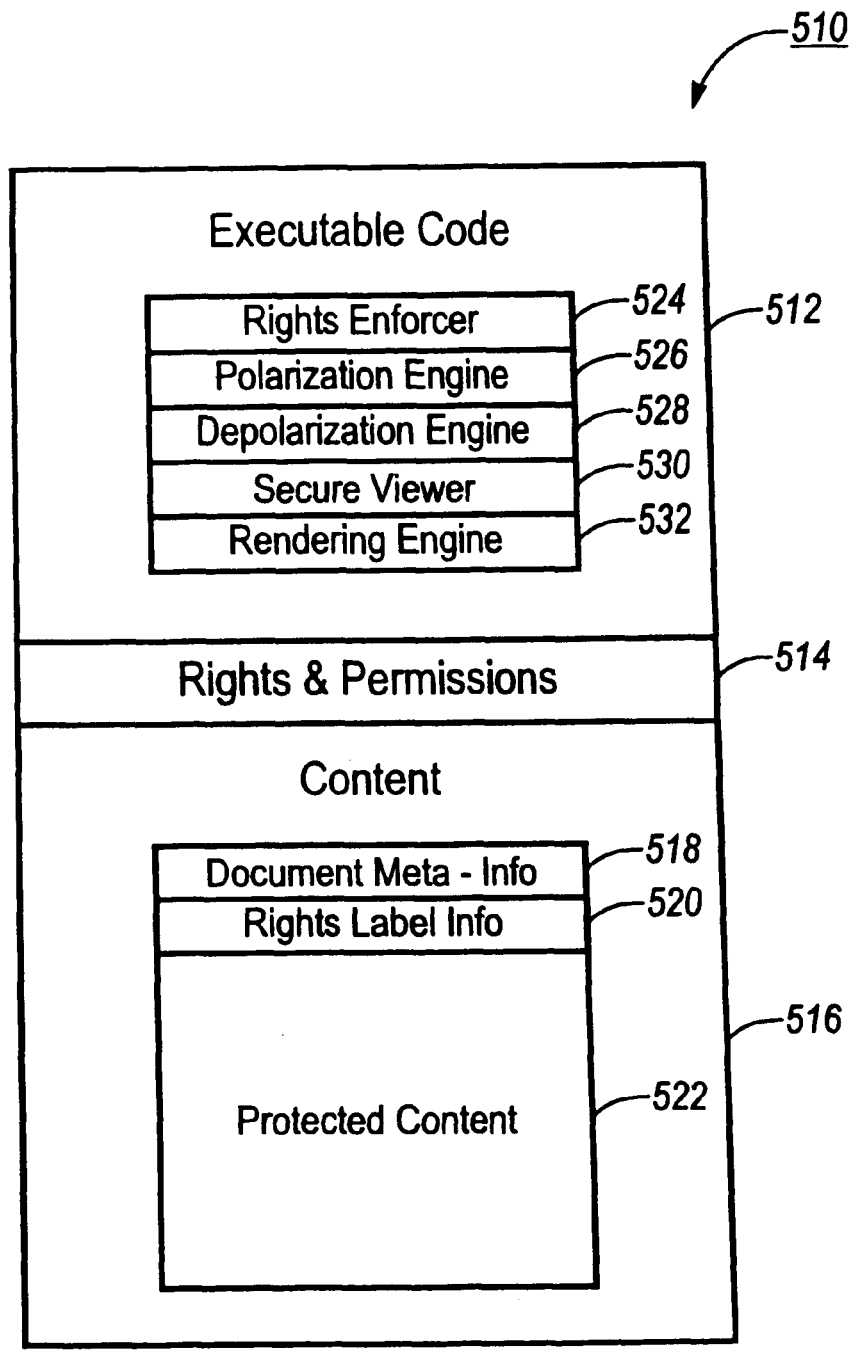
FIG. 5 is a functional block diagram illustrating the data structures present in a self-protecting document according to an embodiment of the invention.

The decryption schemes described with reference to FIGS. 3 and 4 above are enabled by a unique document structure, which is shown in detail in FIG. 5. As discussed above, certain operations performed by the system and method of the invention require trusted components. One way to ensure that certain unmodified code is being used to perform the trusted aspects of the invention is to provide the code along with the documents. The various components of a self-protecting document according to the invention are illustrated in FIG. 5.

The problem of document protection is approached by the invention without any assumptions on the presence of trusted hardware units or software modules in the user's system. This is accomplished by enhancing a document to be an active meta-document object. Content owners (i.e., authors or publishers) attach rights to a document that specify the types of uses, the necessary authorizations and the associated fees, and a software module that enforces the permissions granted to the user. This combination of the document, the associated rights, and the attached software modules that enforce the rights is the self-protecting document ("SPD") of the invention. A self-protecting document prevents the unauthorized and uncontrolled use and distribution of the document, thereby protecting the rights of the content owners.

The self-protecting document 510 includes three major functional segments: an executable code segment 512 contains certain portions of executable code necessary to enable the user to use the encrypted document; a rights and permissions segment 514 contains data structures representative of the various levels of access that are to be permitted to various users; and a content segment 516 includes the encrypted content 116 (FIG. 1) sought to be viewed by the user.

In a preferred embodiment of the invention the content segment 516 of the SPD 510 includes three subsections; document meta-information 518 (including but not limited to the document's title, format and revision date), rights label information 520 (such as a copyright notice attached to the text, as well as rights and permissions information), and the protected content 520 (the encrypted document itself).

In one embodiment of the invention, the, rights and permissions segment 514 includes information on each authorized user's specific rights. A list of terms and conditions may be attached to each usage right. For example, user John Doe may be given the right to view a particular document and to print it twice, at a cost of $10. In this case, the rights and permissions segment 514 identifies John Doe, associates two rights with him (a viewing right and a printing right), and specifies terms and conditions including the price ($10) and a limitation on printing (twice). The rights and permissions segment 514 may also include information on other users.

In an alternative embodiment, the right's and permissions segment 514 includes only a link to external information specifying rights information. In such a case, the actual rights and permissions are stored elsewhere, for example on a networked permission server, which must be queried each time the document is to be used. This approach provides the advantage that rights and permissions may be updated dynamically by the content owners. For example, the price for a view may be increased, or a user's rights may be terminated if unauthorized use has been detected.

In either scenario, the rights and permissions segment 514 is cryptographically signed (by methods known in the art) to prevent tampering with the specified rights and permissions; it may also be encrypted to prevent the user from directly viewing the rights and permissions of himself and others.

The executable code segment 512, also called the "SPD Control," also contains several subsections, each of which comprises a software module at least partially within the executable code segment. In one embodiment of the invention, the Java programming language is used for the SPD Control; however, it is contemplated that any platform-independent or platform-specific language, either interpreted or compiled, can be used in an implementation of this invention.

A rights enforcer 524 is present to verify the user's identity, to compare a requested action by the user to those actions enumerated in the rights and permissions segment 514, and to permit or deny the requested action depending on the specified rights. The operation of the rights enforcer 524 will be discussed in further detail below, in connection with FIG. 7.

A secured polarization engine 526 is also present within the executable code segment 512; it serves to read and polarize the data according to the system state (or other polarization key) as discussed above. In a preferred embodiment of the invention, the polarization engine 526 acts upon the document before it is stored or decrypted, so the document is never stored in the clear on the user's system. The polarization engine 526 is secured, that is, it is cryptographically signed and encrypted, to prevent tampering, reverse-engineering, and disassembling.

A counterpart depolarization engine 28 is also included to enable the generation of clear presentation data from the polarized content (see FIG. 4). The depolarization engine includes a set of secure window objects, providing a relatively tamper-proof interface to the rendering API (application program interface) of the user's system. The secure window objects are resistant to being intercepted, thereby reducing the possibility that the document, in its clear form, can be reconstructed by intercepting and receiving the data intended for the operating system.

A counterpart depolarization engine 528 is also included to enable the generation of clear presentation data from the polarized content (see FIG. 4). The depolarization engine 528 provides a relatively tamper-proof interface to the logical or physical output device (e.g., the user's display device). The input to the depolarization engine 528 is polarized presentation data. Therefore, it that data is intercepted, it will not reveal any of the clear content without further depolarization which depends on, for example, the user's system state.

A secure viewer 530 is optionally included in the executable code segment 512. The secure viewer 530 is used to permit only those levels of access that are permitted according to the rights and permissions segment 514. For example, if the user purchased only sufficient rights to view a document (and not to save or print it), the viewer will not permit the user to save, print, or perform the standard cut-and-paste operations possible in most modern operating systems.

Finally, a rendering engine 532 is included or referenced within the executable code segment 512. The rendering engine 532 need not be secure. Accordingly, the code for the rendering engine 532 can be included within the SPD applet, or alternatively retrieved (via a secure link) from some other location. In either case, the rendering engine 532 is adapted to receive polarized document contents and produced polarized presentation data therefrom (see FIG. 4).

The foregoing aspects and elements of the self-protecting document 510 will be discussed in further detail below, in conjunction with the operation of the system.

Figure 6:
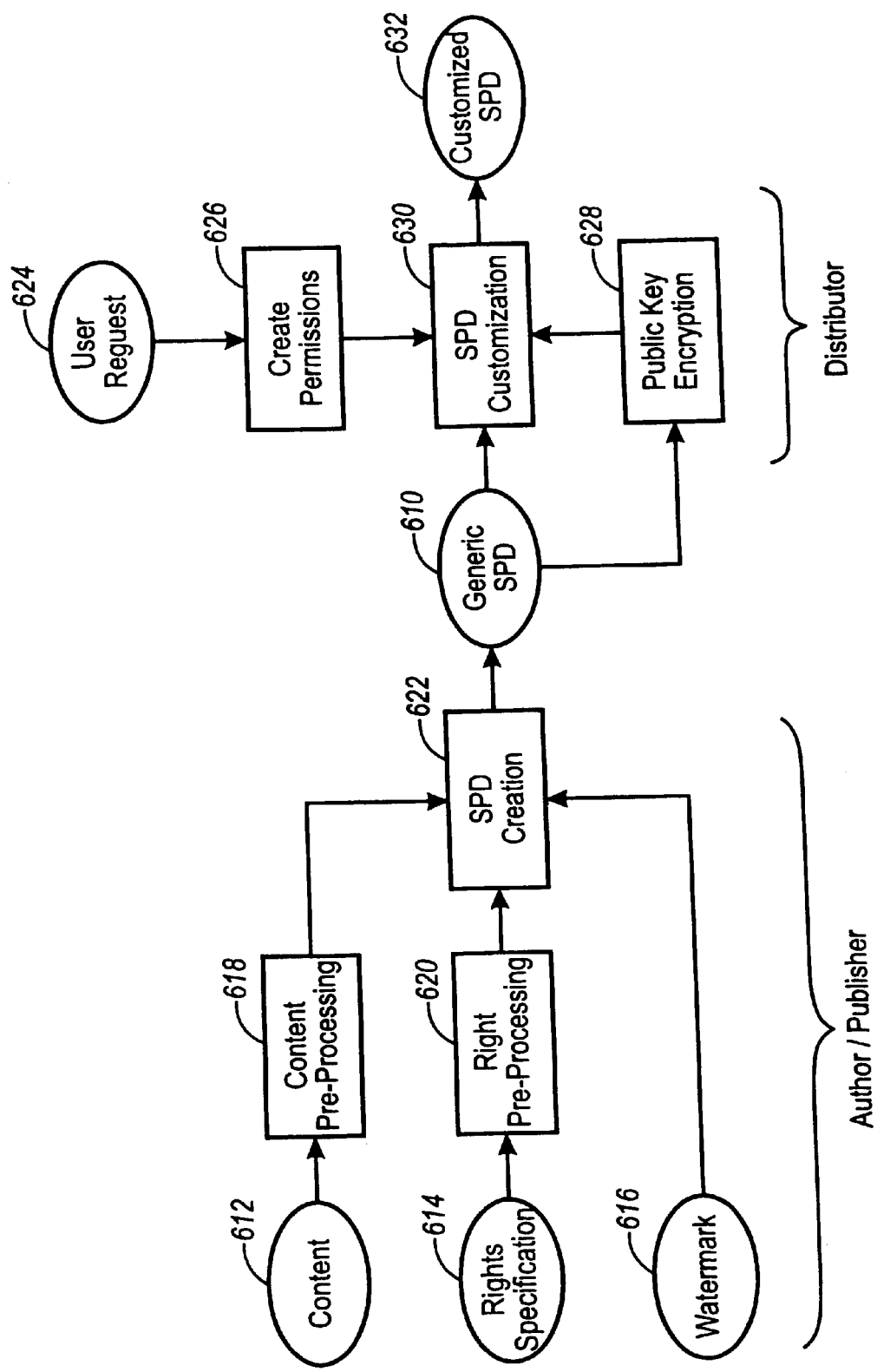
FIG. 6 is a flow diagram illustrating the creation and customization of a self-protecting document according to an embodiment of the invention.

FIG. 6 shows the steps performed when a self-protecting document 510 is created and distributed. A generic SPD 610 includes no user-specific rights information and is not encrypted for any particular user. The generic SPD 610 is created from three items: the original document content 612, in clear (unencrypted) form; a high-level rights specification 614; and an optional watermark 616.

The content 612 is pre-processed (step 618) to lay out the document as desired by the author or publisher. For example, a preferred page size, font, and page layout may be selected. The content 612 is essentially "pre-rendered" in the content pre-processing step so that it will be in a format that is compatible with users' systems and the SPD. For example, the content 612 may be converted from Microsoft Word (".DOC") or Adobe Acrobat (".PDF") format to a different format specially adapted to be read by the rendering engine 532 (FIG. 5). In one embodiment of the invention; multiple versions of the content 612 are generated by the content pre-processing step and stored in the generic SPD 610; those different versions may then be separately purchased by the user according to his needs.

The high-level rights specification 614 sets forth what combinations of access rights are permissible. Such a rights specification is tailored to a particular document, and is capable of describing different groups of rights for different classes of downstream users. For example, a publisher may be given the right to distribute up to 100,000 copies of a document at a $1.00 per copy royalty, with additional copies yielding a $2.00 royalty. Similarly, users may be given the option to purchase a version of the document that "times out" after one month, one year, or never. Several possible limitations are described with reference to a detailed example, which is set forth below.

Digital Property Rights Language (DPRL) is a language that can be used to specify rights for digital works. It provides a mechanism in which different terms and conditions can be specified and enforced for rights. Rights specifications are represented as statements in DPRL. For details, see, for example, U.S. Pat. No. 5,715,403 to Stefik, entitled "System for Controlling the Distribution and Use of Digital Works Having Attached Usage Rights Where the Usage Rights are Defined by a Usage Rights Grammar." Enforcement of rights and verification of conditions associated with rights is performed using the SPD technology.

Different rights can be specified for different parts of a digital work using a work" specification. Within a work specification, different sets of rights applicable to this work are specified. Rights can be grouped into named-groups called "rights groups". Each right within a rights group is associated with a set of conditions. Conditions can be of different types: fee to be paid, time of use, type of access, type of watermark, type of device on which the operation can be performed, and so on. DPRL allows different categories of rights; transfer, render rights, derivative work rights, file management rights and configuration rights. Transport rights govern the movement of a work from one repository to another. Render rights govern the printing and display of a work, or more generally, the transmission of a work through a transducer to an external medium (this includes the "export" right, which can be used to make copies in the clear). Derivative work rights govern the reuse of a work in creating new works. File management rights govern making and restoring backup copies. Finally, configuration rights refer to the installation of software in repositories.

An exemplary work specification in DPRL is set forth below:
(Work:

---

(Rights-Language-Version; 1.02)
(Work-ID: "ISDN-1-55860-166-X; AAP-2348957tut")
(Description: "Title., 'Zuke-Zack, the Moby Dog Story'
    Author: 'John Beagle'
    Copyright 1994 Jones Publishing")
(Owner: (Certificate:
        (Authority: "Library of Congress")
        (ID: "Murphy Publishers")))
(Parts: "Photo-Celebshots-Dogs-23487gfj" "Dog-Breeds-Chart-AKC")
(Comment: "Rights edited by Pete Jones, June 1996.")
(Contents: (From: 1) (To: 16636))
(Rights-Group: "Regular"
(Comment: "This set of rights is used for standard retail editions.")
(Bundle:
(Time: (Until; 1998/01/01 0:01))
    (Fee: (To: "Jones-PBLSH-18546789" (House: "Visa")))
(Play:
    (Fee: (Metered: (Rate: 1.00 USD), (Per. 1:0:0) (By: 0:0.1)) ))
(Print:
    (Fee: (Per-Use: 10.00 USD))
    (Printer:
        (Certificate:
            (Authority: "DPT"
            (Type: "Trusted Printer-6")))
    (Watermark:
        (Watermark-Str: "Title: 'Zeke Zack - the Moby Dog'
                Copyright 1994
                by Zeke Jones.
                All Rights Reserved,")
        (Watermark-Tokens: user-id institution-location
                render-name render-time)
(Transfer:
(Copy: (Pee: (Per-Use; 10.00 USD) ))
(Copy: (Access:
    (User: (Certificate:
            (Authority: "Murphy Publishers")
            (Type: "Distributor
(Delete:)
(Backup:)
(Restore: (Fee: (Per-Use: 5.00 USD))) ))

---

This work specification has a rights group called "Regular," which specifies rights for standard retail editions of a book titled "Zuke-Zack, the Moby Dog Story." The work specification expresses conditions for several rights: play, print, transfer, copy, delete, backup, and restore. The work in the example includes two other parts, a photograph and a, chart of breeds incorporated from other sources. A "bundle" specification bundles a set of common conditions that apply to all rights in the group. This specification states that all rights in the group are valid until Jan. 1, 1998 and that the fees should be paid to account "Jones-PBLSH-18546789". The clearing-house for this transaction should be Visa. The following contract applies; the work cap be played by paying $1,00 every hour, where fee is accumulated by the second; the work can be printed on TrustedPrinter-6 which is certified by "DPT" for a fee of $ 10,00 per print; the printed copy should have a watermark string (as, depicted) and a list of tokens signifying "fingerprint" information known at the time it is printed; this work can be copied either by paying $10.00 or by acquiring a distributor certificate from Murphy publishing; and unrestricted transfer, deletion or backing up of this work is permitted (restoration costs $5.00).

The high-level rights specification 614 is also subject to a pre-processing step (step 620), in which the high-level (i.e., human-readable) specification is compiled into a more-efficient data structure representation for use by the invention. The generic SPD 610 is then created (step 622) by combining the pre-processed content 612, the pre-processed rights specification 614, and the watermark 616. A watermark may be added by any means known in the art; it may be either visible or concealed within the SPD. The generic SPD 610 may also optionally be encrypted by the author/publisher 110 for transmission to the distributor 114 (FIG. 1).

The generic SPD 610 is then received by the distributor 114, and is stored for later customization. When a user request 624 is received by the distributor 114 (either directly or through the clearinghouse 122 or other intermediary), the distributor 114 creates a set of user permissions (step 626 that is consistent with both the user request 624 and the rights specification 614. If there is no such consistent set of permissions,, then no further action is performed on that user's behalf (other than an optional notification message to the user).

The user permissions and the user's public key 628 are then used to generate (step 630) a customized SPD 632 adapted to be used by the user. The user permissions from step 626 are stored in the rights and permissions segment 514 of the SPD 632, and the user's public key 628 is used to encrypt the content in the content segment 516 of the SPD 632. A public-key encryption mechanism can be used to transform the SPD from the generic form to the customized SPD 632. Such a mechanism is useful if the SPD has to be confidentially transferred between different parties, e.g., author to publisher to retailer to consumer, with rights protection at, each stage. It should further be noted that multiple user requests can be composed and accommodated within a single SPD 632; there are techniques known in the art that are capable of using multiple public keys to encrypt a document such that any of the users' private keys can be used to decrypt it.

The resulting custom SPD 632 is then transmitted to the user 118 by any available means, such as via a computer network or stored on a physical medium (such as a magnetic or optical disk).

Figure 7:
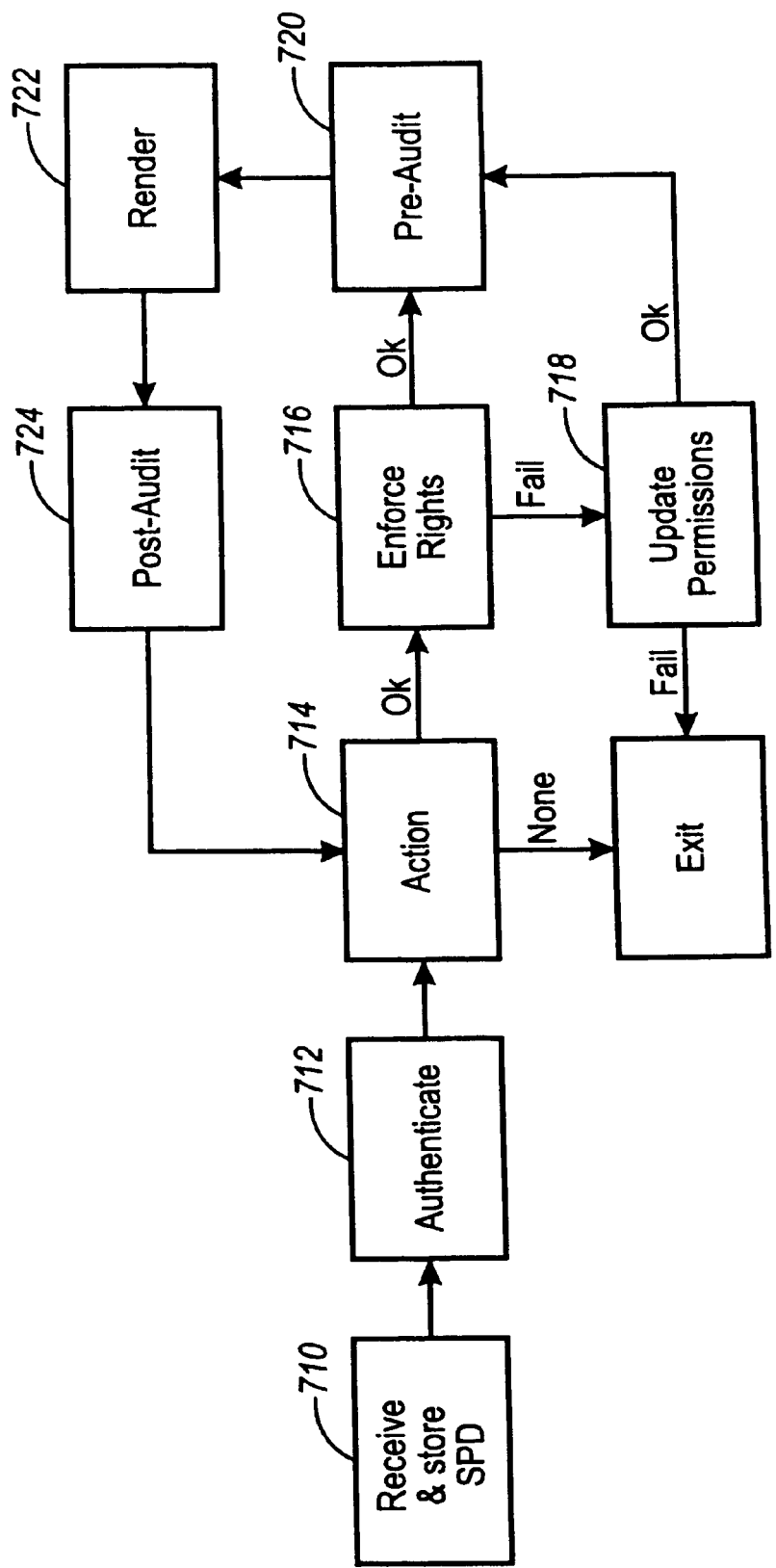
FIG. 7 is a flow diagram, from a user's perspective, illustrating the actions performed in handling and using a self-protecting document according to the invention.

The operations performed when a user receives an SPD are depicted in the flow diagram of FIG. 7. The SPD is first received and stored at the user's system (step 710); in many cases, it is not necessary to use the SPD right away. When usage is desired, the user is first authenticated (stop 712), typically with a user name and a password or key, The system then determines what action is desired by the user (step 714). When an action is chosen, the rights-enforcement step of the invention (step 716) verifies the conditions associated with the desired action (such as the fee, time, level of access, watermark, or other conditions); this can be performed locally via the SPD applet 512 (FIG. 5) or by accessing a rights enforcement server.

If the rights enforcement step (step 716) fails, an update procedure (step 718) is undertaken. The user may choose to update his permissions, for example by authorizing additional fees. After the satisfactory verification of conditions, a pro-audit procedure (step 718) is performed, in which the SPD system logs verification status to a tracking service (e.g., the audit server 130 of FIG. 1). The content is then securely rendered to the screen (step 722) as discussed above. When the user is finished, a post-audit procedure (stop 724) is performed in which the amount of usage is updated with the tracking service. The SPD system then awaits further action.

The protection yielded by the SPD is derived from the user's inability to capture a useful form of the document at any intermediate stage during the rendering process. This is accomplished by decrypting the document contents to a clear form at the latest possible stage, ideally in the last step.

The SPD decryption model is illustrated in Figure B. E denotes the encryption function performed by the publisher; D denotes the decryption performed at the user's system, and R denotes the rendering transformation. Many prior systems use a first sequence of transformations 810, $D(E(x))$ followed by $R(D(E(x)))$. As stated previously, the early decryption leaves the document in a vulnerable state. Ideally, the transformations are performed in the reverse order 812, $R'(E(x))$ followed by $D(R'(E(x)))$ This postpones decryption to the latest possible time.

The existence of R', a rendering operation that can be performed before decryption, is determined by the following equality:

$$D(R'(E(x)))=R(D(E(x)))$$

In case that the encryption and decryption functions are commutative, that is, $E(D(x))=D(E(x))$ for any x, the existence of R' is ensured:

$$R'(y)=E(R(D(y))) \text{ for } yE(x)$$

In practice, encryption and decryption functions in popular public-key cryptographic systems such as the RSA system an ElGamal discrete logarithm system satisfy the commutation requirement. This means that the transformation R' exists if these cryptographic systems are used for encryption and decryption.

The path $x'=D(R'(E(x)))$ portrays an ideal SPD solution to the document protection against unauthorized document usage and distribution. A scenario of distributing and using a document can be described as follows. When a user purchases the document, the document is encrypted using a user's public information and is transmitted over an insecure network channel such as the Internet. The encrypted document has the rights information attached to it and a protecting applet 512 that enforces the rights and permissions granted to the user by the content owner. Upon a user's request on using the document, the applet verifies the rights and permissions and generates from the encrypted document the presentation format of the original document. As any intermediate form of the document before the final presentation data is encrypted with the user's private information, the SPD model of document protection ensures that any intermediate form of the document is not useful to other systems wherever it is intercepted.

Clearly, this ideal model relies on what or not the transformation R' that corresponds to the rendering transformation R can be computed efficiently, and in particular on whether or not an invocation of the decryption function D is necessary during an implementation of R'. A trivial case in which R can be implemented efficiently is where R is commutative with the encryption function E. When this happens, $$R'(y)=E(R(D(y)))=R(E(D(y)))=R(y)$$

for y=E(x). In this case, R'=R.

Figure 8:
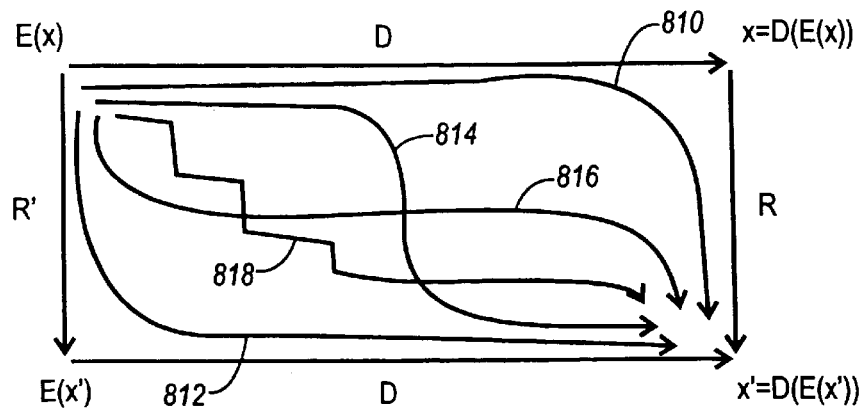
FIG. 8 is a graph illustrating several possible paths between an unrendered and encrypted document, and rendered and decrypted presentation data.

Consideration of FIG. 8 reveals that many intermediate solutions (e.g., intermediate solutions 814, 816, and 818) to the document protection problem may exist on the users system between the two extremes x'=R(D(E(x))), which has no protection on x=D(E(x)), and x'=D(R'(E(x)))), which has ideal protection (under the assumptions set forth above). As depicted in FIG. 8, one may consider different paths from the encrypted document E(x) to the presentation data x' that correspond to different combinations of partial rendering transformations and partial decryption transformations. Again, it should be recognized that delaying the decryption D in any path increases the protection level to the document.

Figure 9:
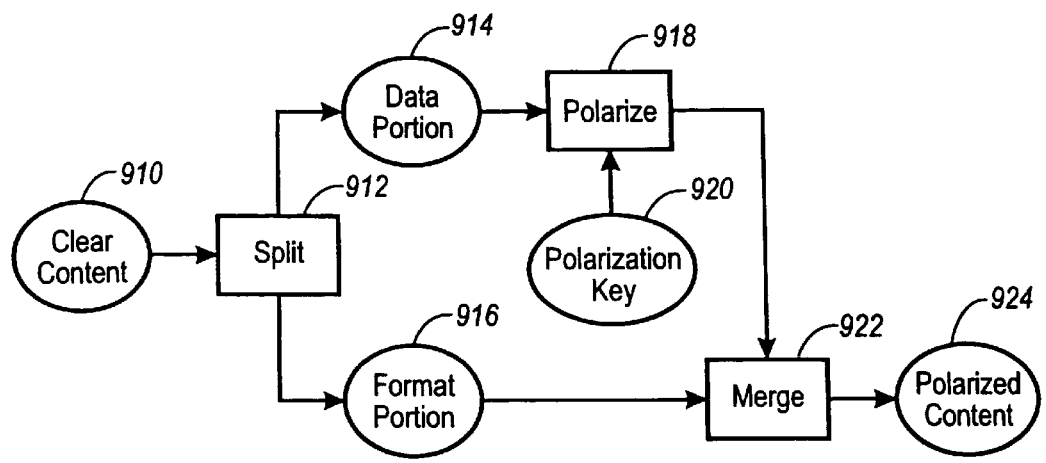
FIG. 9 is a flow diagram illustrating a polarization process according to the invention in which document format information remains in the clear for rendering.

As discussed above, one alternative method of delaying decryption to the last possible moment employs a polarization technique that encrypts only the document contents, not the format or the entire document as a whole. This possibility is shown in FIG. 9. Beginning with the clear document content 910 (which, it should be noted, does not exist in any single identifiable location during the user's processing, but is rather a transient state occurring within step 412 of FIG. 4), the document is split (step 912) into a data portion 914 and a format portion 916. The data portion 914: is polarized (stop 918) using the polarization key 920 and merged (step 922) with the clear format portion 916. This results in polarized content 924 that can be rendered to polarized presentation data without first decrypting the content. It should be observed that this form of polarization is likely less secure than wholesale encryption with the polarization key, since a lot of information can potentially be derived from the layout of a document, word lengths, line lengths, etc.; however, this scheme will present a useful deterrent to casual copyright infringement.

While certain exemplary embodiments of the invention have been described in detail above, it should be recognized that other forms, alternatives, modifications, versions and variations of the invention are equally operative and would be apparent to those skilled in the art. The disclosure is not intended to limit the invention to any particular embodiment, and is intended to embrace all such forms, alternatives, modifications, versions and variations. For example, the portions of the invention described above that are described as software components could be implemented as hardware. Moreover, while certain functional blocks are described herein as separate and independent from each other, these functional blocks can be consolidated and performed on a single general-purpose computer, or further broken down into sub-functions as recognized in the art.

Accordingly, the true scope of the invention is intended to cover all alternatives, modifications, and equivalents and should be determined with reference to the claims set forth below.

What is claimed is:

1. A self-protecting document embodied as data stored on a tangible storage medium, the self-protecting document comprising:

an encrypted content segment containing data representative of document contents;

a permissions segment; and a code segment comprising a polarization subsection.

2. The self-protecting document of claim 1, wherein the code segment further comprises: a rights-enforcement subsection; and, a rendering subsection.

3. The self-protecting document of claim 1, wherein the code segment further comprises an executable code for enabling use of the self protecting document.

4. The self-protecting document of claim 1, wherein the polarization subsection comprises a polarization engine and a depolarization engine.

5. The self-protecting document of claim 1, wherein the polarization subsection contains executable computer code adapted to modify the encrypted content segment.

6. The self-protecting document of claim 1, wherein the polarization subsection contains executable computer code adapted to modify the encrypted content segment into a polarized content segment.

7. A method for creating a self-protecting document, comprising the steps of:

receiving an unencrypted document;

modifying the unencrypted document to produce an original content segment;

creating a rights specification;

creating a code segment containing a polarization subsection; and combining the original content segment, the rights specification, and the code segment to produce a generic self-protecting document.

8. The method of claim 7, wherein the modifying step comprises the step of encrypting the unencrypted document.

9. The method of claim 7, wherein the modifying step further comprises the stop of pre-processing the unencrypted document.

10. The method of claim 7, further comprising the step of customizing the generic self-protecting document.

11. The method of claim 10, wherein the customizing step comprises the substeps of:

receiving a user's document request;

receiving the user's public key;

creating a rights and permissions segment consent with the user's document request and the rights specification;

encrypting the original content segment to produce an encrypted content segment; and combining the code segment, the rights and permissions segment, and the encrypted content segment to produce a customized self-protecting document.

* * * * *